W. H. FROST.
DYNAMO ELECTRIC MACHINE.
APPLICATION FILED JULY 25, 1904.
928,037.
Patented July 13, 1909.
3 SHEETS—SHEET 1.
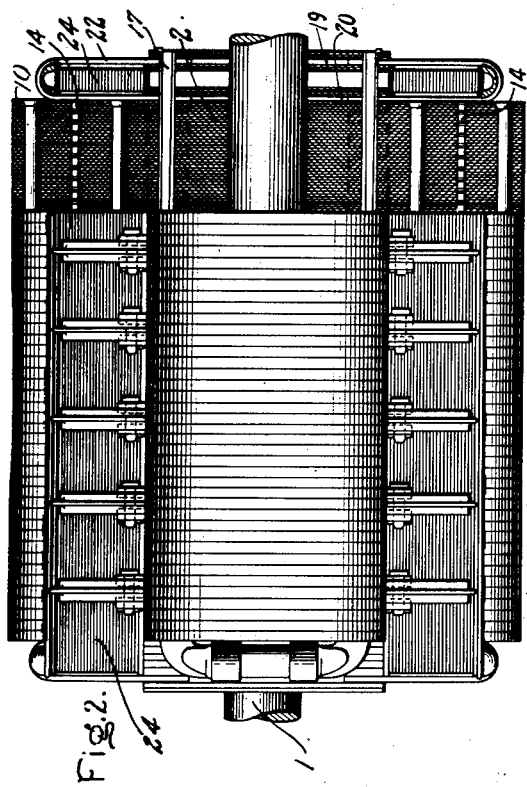
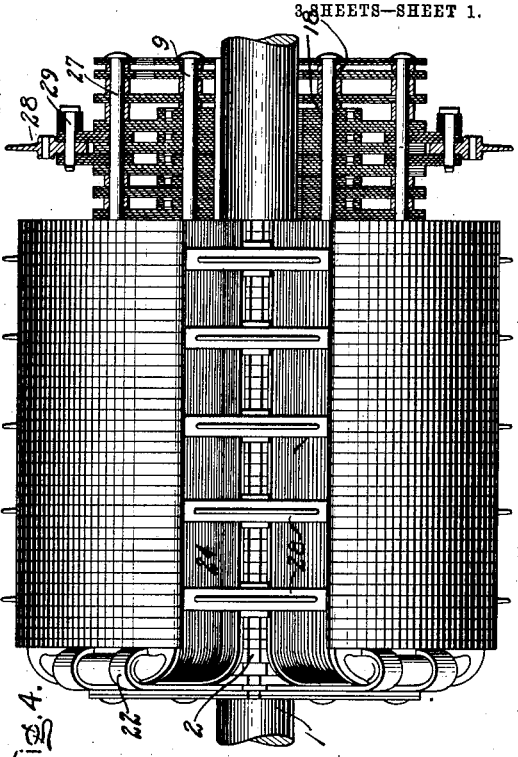
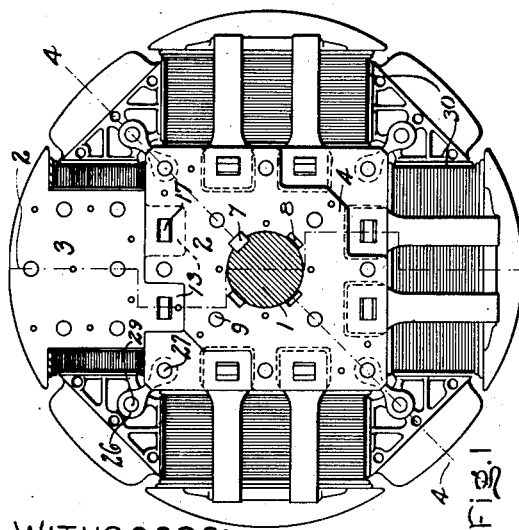
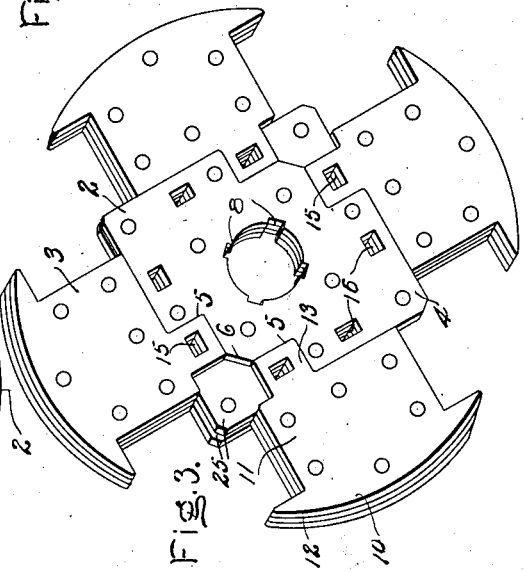
WITNESSES:
George A. Thornton
Helen Oxford
INVENTOR:
William H. Frost,
by Albert G. Davis
Att'y.

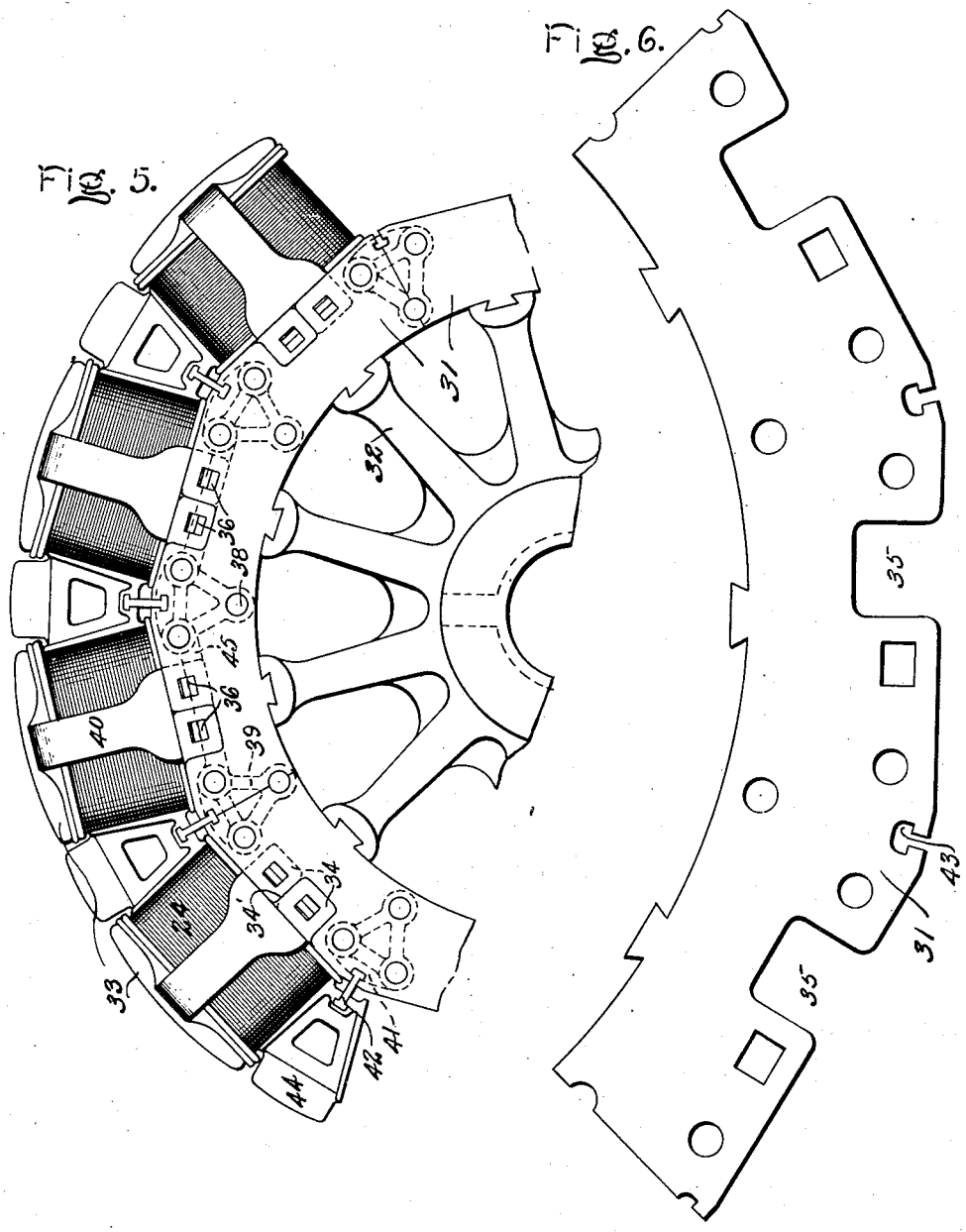

W. H. FROST.
DYNAMO ELECTRIC MACHINE.
APPLICATION FILED JULY 25, 1904.
928,037.
Patented July 13, 1909.
3 SHEETS—SHEET 3.
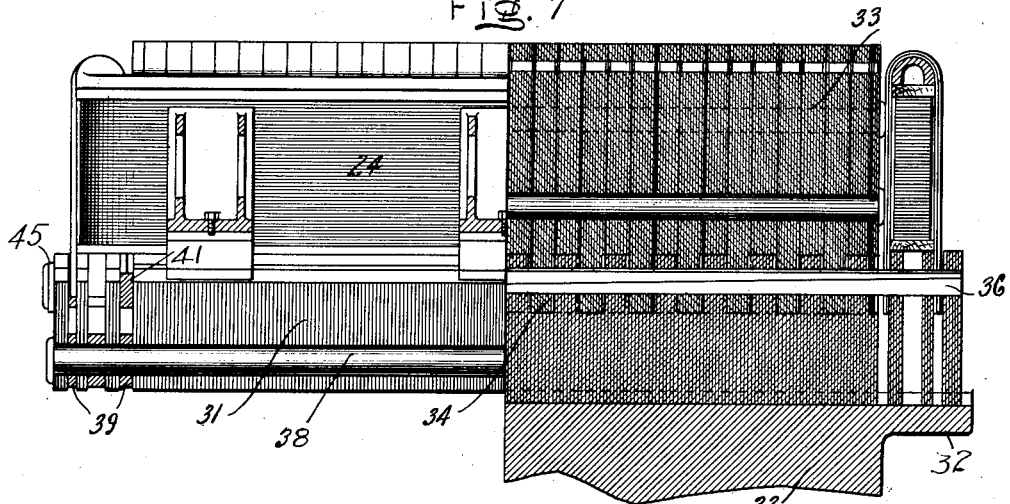
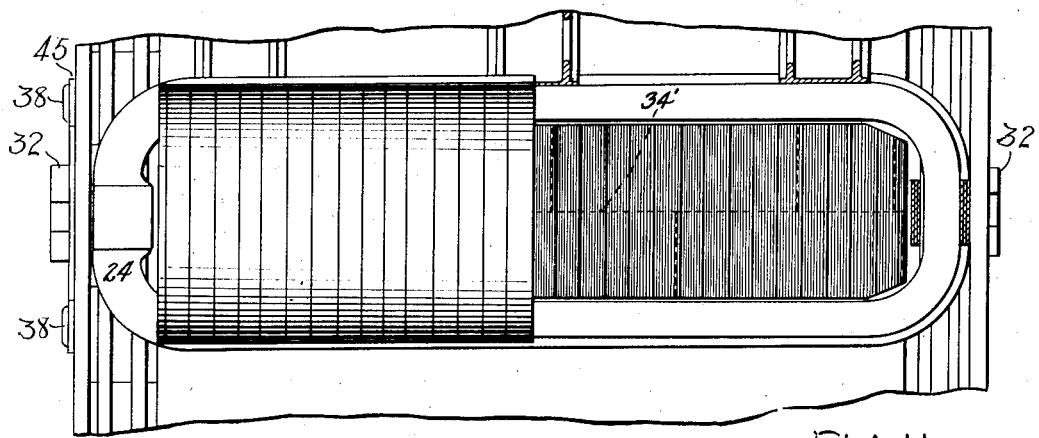
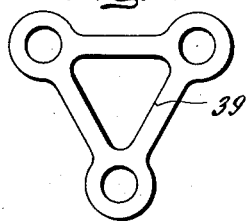
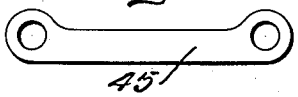
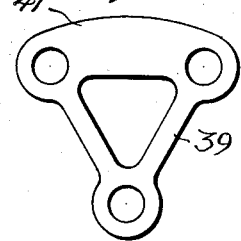
WITNESSES:
George A. Thornton.
INVENTOR:
William H. Frost,
By Albert H. Davis
Atty.

UNITED STATES PATENT OFFICE.

WILLIAM H. FROST, OF SCHENECTADY, NEW YORK, ASSIGNOR TO GENERAL ELECTRIC COMPANY, A CORPORATION OF NEW YORK.

DYNAMO-ELECTRIC MACHINE.

No. 928,037.　　　　Specification of Letters Patent.　　　Patented July 13, 1909.

Application filed July 25, 1904. Serial No. 218,004.

*To all whom it may concern:*

Be it known that I, WILLIAM H. FROST, a citizen of the United States, residing at Schenectady, county of Schenectady, State of New York, have invented certain new and useful Improvements in Dynamo-Electric Machines, of which the following is a specification.

In the operation of dynamo-electric machines it is frequently desirable that the movable member shall rotate at a very high speed. This is particularly true for instance with field magnet structures directly connected to and driven by steam turbines.

The object of my present invention is the production of a revolving field magnet which is simple and easy of construction and is well adapted to sustain the stresses produced by its operation at high speeds.

The various features of novelty which characterize my invention are pointed out with particularity in the claims annexed to and forming a part of this specification. For a better understanding of my invention, however, reference may be had to the accompanying drawings and description in which I have illustrated and described my invention.

Of the drawings, Figure 1 is an end elevation of a four-pole rotating field magnet with parts broken away and in section; Fig. 2 is a side elevation of the construction shown in Fig. 1 with a portion in section on the line 2 2 of Fig. 1; Fig. 3 is a perspective view showing the method of assembling the units forming the core or frame of the field manget; Fig. 4 is an elevation on a plane parallel to the shaft of the field magnet and to the line 4 4 of Fig. 1, a portion of the right-hand end of this figure in section on the line 4 4; Fig. 5 is a partial end elevation showing a portion of a field magnet having more than four poles; Fig. 6 is an elevation of a lamina used in the form of a body unit for the magnet of Fig. 5; Fig. 7 is an elevation, and Fig. 8 is a plan view being partly in section of a portion of the field magnet shown in Fig. 5; and Figs. 9, 10 and 11 are elevations of elements of the field magnet shown in Fig. 5.

Referring first to the construction shown in Figs. 1 to 4, inclusive, the core of the field magnet which is supported on the shaft 1 comprises a body portion 2 and polar portions 3. The body portion and the polar portions are made up of a number of units which may each consist of a single lamina but preferably are formed of a number of laminæ riveted together, The units 4 of which the body 2 is formed are shown clearly in outline in Figs. 1 and 3. Each unit 4 is symmetrical about axes which extend midway between adjacent polar portions 3 but is not symmetrical about axes parallel to the edges of the polar pieces. The outline of the body 2 is substantially rectangular. Each unit 4, however, has portions cut away at a pair of diametrically-opposed corners to form at each corner a pair of recesses 5 5 separated from each other by a surface 6. It will thus be observed that each of the four sides of the units 4 may be regarded as formed with a recess 5. The recesses 5 are unsymmetrically located in these sides, however, successive notches being located at opposite sides of the center of each side of the unit 4.

The units 4 are each formed with a central aperture through which the shaft 1 passes. The shaft 1 is formed with a keyway and carries a key 7 which extends parallel to its axis. The units 4 are formed with four similar key-ways 8, adjacent key-ways being separated by equal angular distances. In assembling the units 4 on the shaft adjacent units are displaced a quarter of a turn with respect to each other. Preferably successive units are angularly displaced in the same direction so that if there is any difference in thickness between the body and edge portions of the stock from which the laminæ are stamped no distortion of the body 2 will result therefrom. When the units forming the body portion are assembled two parallel rows of recesses will be formed in each side of the rectangular body portion. Bolts or rivets 9 serve to secure together the assembled units 4 forming the body 2.

Each polar portion 3 is formed of a number of units 10, each of which preferably consists of a number of laminæ riveted together. Each unit 10 comprises a body portion 11, tip portion 12, and tongue portion 13. The tongue portion 13 which extends inwardly from the inner end of each unit 10 is located at one side of the center of the unit. In assembling the polar portions alternate units 10 are reversed. This has the effect of creating two parallel rows of tongue portions 13 with adjacent tongue portions 11 in each row separated by a space equal to the thickness of the units. The units comprising each polar portion are secured together by a number of bolts or rivets 14.

In assembling the body portion and polar portions the two rows of tongues of each polar projection are inserted in the corresponding rows of recesses formed in each side of the body portion. Each tongue has a rectangular-shaped opening 15 formed in it. Corresponding openings 16 are formed in the units 4 and the polar portions are locked to the body portion by pairs of reversely-tapered wedges 17 which pass through the openings 15 in one row of tongues and corresponding openings 16 in the units 4. It will be observed that with this construction each polar projection is locked to every unit of the body portion, and that the stress given to one body unit by one polar portion is balanced by the stresses given to the body unit by the other polar portions.

Washers 18 placed on the bolts or rivets 9 near their ends and beyond the ends of the core of the polar portions 3 proper separate certain of the body units to form spaces 19 and 20 in which the ends of the U-shaped coil-retaining straps 22 are inserted. The straps 22 embrace the ends of the coils 24 which surround the polar portions. The ends of the straps are slotted and are retained in place by the wedges 17.

In the construction shown in Figs. 5 to 11, inclusive, a vertical shaft field magnet is shown formed with a larger number of polar projections than the field magnet shown in Figs. 1 to 4 inclusive. The units 31 which correspond to the body units 4 of the four-pole construction, are dovetailed into the ends of the spider arms 32. In the construction shown there are as many spider arms as polar portions. The polar portions 33 of this construction are similar to the polar portions 3 of the construction shown in Figs. 1 to 4 except that the rows of projections or tongues 34 are closer together, the inner edges 34' of the tongues in the two rows being in the same radial plane.

Each unit 31 is formed with three recesses 35 each of which receives one set of projections from a pole piece 33. The recesses 35 in each unit are at one side of the lines passing through the centers of the corresponding pole pieces. In assembling the units 31 adjacent units are reversed so that two rows of recesses are formed into which the projections from the pole pieces 33 may enter.

The pole pieces 33 are secured to the body of the field magnet by reversely-tapered wedges 36 which are similar to the wedges 17 above described. Bolts 38 are employed to secure the assembled body portions together. Apertured members 39 placed at the ends of the field magnet structure serve as links for connecting together the bolts which are located where the body units break joint. The members 39 also serve as washers to separate certain of the end units to form spaces in which the coil end supports 40, similar to the supports 22 of the first construction, are secured.

Other link members 45 secured to the bolts at the lower end of the field magnet construction serve as stops or key-retaining devices to engage such of the wedges or keys 36 as have their lower ends the thicker and hold them in place.

I have shown my machine as being provided with a plurality of independent side braces or coil supports between each two polar portions. In the arrangement illustrated in Figs. 1 to 4, these coil supports are indicated by the numeral 28, and are formed with the surfaces 30 which engage the sides of adjacent windings 24. Each of these coil supports is fastened by a bolt 29 to a pair of links 26. These pairs of links are arranged at intervals along each corner of the body portion of the magnet, and are secured in spaces 25 by bolts 27. These spaces 25 are formed between the unnotched corners of adjacent body units of each set. In the arrangement of Figs. 5 to 11, the coil supports or side braces are indicated by the numeral 44, and are formed with recesses. Keys 42 slide in under-cut recesses formed in the units between the pole-pieces. The recesses in the side braces interlock with the outer portion of the keys 42. The upper portions of the members 39 located at the lower end of the field magnet structure are extended, as indicated at 41, to form stops or key-retaining devices for the lower ends of the keys 42. The key-retaining devices shown in Figs. 5 to 11 are comprised within my invention, but the construction and arrangement of the coil supports or braces form no part of my invention, but are claimed in the application of Henry G. Reist, Serial No. 247,849, filed March 1, 1905.

It will be understood by all those skilled in the art that many changes may be made in the form of my invention without departing from the spirit thereof.

What I claim as new and desire to secure by Letters Patent of the United States, is,—

1. In a field magnet structure comprising a body portion, polar portions formed of units detachably secured thereto, keys for securing the pole pieces to the body portion, bolts for securing the body units together, and key-retaining devices secured in place by said bolts.

2. In a field magnet, a laminated body portion formed of units each unit being formed with notches or recesses to receive one tongue from each of a plurality of polar projections, and polar projections formed each with two rows of notched or recessed tongues out of line with each other.

3. In a field magnet structure, a laminated body portion formed of similar units, adjacent units being angularly displaced with respect to each other, each of said units being formed with a plurality of tongue-receiving notches or recesses, and polar projections formed with two sets of notch- or recess-entering tongues, said sets of tongues being out of line with each other.

4. In a four-pole field magnet structure, a body portion composed of a series of similar units, each of said units being provided with a tongue-receiving notch or recess for each polar projection, said recesses being unsymmetrically placed in said units, and adjacent units being angularly displaced with reference to each other to form two sets of units, and polar projections formed each with one set of tongues which enter the recesses in one set of body units, and another set of tongues which enter the recesses in another set of body units.

5. In a field magnet structure, a body portion comprising a plurality of sets of units, the units in each set being similar and similarly placed and provided each with a plurality of tongue-receiving notches or recesses, a plurality of polar projections each of which is provided with one set of tongues which enter the recesses in one set of body units, and with another set of tongues which enter the recesses in another set of body units.

6. A four-pole magnet structure the body of which is composed of units, each of the units being rectangular in outline with portions of a pair of diametrically-opposed corners cut away to form a tongue-receiving notch or recess in each side of each unit, and adjacent units being angularly displaced ninety degrees to form two sets of units, four polar projections each of which is provided with two sets of tongues, the tongues in one set entering recesses in one set of body units, and the tongues of the other set entering the recesses in the other set of body units.

7. In a field magnet, a laminated body portion formed of units each unit being formed with notches or recesses to receive one row of tongues from each of three or more polar projections, polar projections formed each with two rows of tongues out of line with each other, and means for securing the tongues to the body units adjacent those having the notches in which the tongues are received.

8. In a field magnet structure, a body portion formed of similar units alternately angularly displaced with respect to each other, each of said units being formed with three or more tongue-receiving notches or recesses, polar projections formed with two rows of internally-projecting tongues, said rows being out of line with each other, and means for securing each row of tongues from each polar projection to the units located between the units in which the notches to receive said row of tongues are formed.

9. In a field magnet structure, polar projections formed each with two rows of notch or recess entering tongues out of line with each other, and a laminated body portion formed of units secured together independently of said polar projections, each unit being formed with notches or recesses to receive one tongue from each end of a plurality of said polar projections.

10. In a field magnet structure, a plurality of polar projections each of which is provided with two sets of recess entering tongues, a body portion comprising a plurality of sets of units connected together independently of said polar projections, the units in each set being similar and similarly placed and provided each with a plurality of tongue receiving notches or recesses, and means for securing said polar projections to said body portion with one set of tongues from each polar projection entering the recesses in one set of body units and the other set of tongues from said polar projections entering the recesses in another set of body units.

11. In a field magnet structure, polar projections formed each with two rows of tongues out of line with each other, a laminated body portion formed of units connected together independently of said polar projections, each unit being formed with notches or recesses to receive one row of tongues from each of three or more polar projections, and means for securing each of the tongues of said projections to the body units adjacent to those having the notches in which the tongue is received.

In witness whereof I have hereunto set my hand this 22nd day of July, 1904.

WILLIAM H. FROST.

Witnesses:
BENJAMIN B. HULL,
HELEN ORFORD.